(12) United States Patent
Wang et al.

(10) Patent No.: US 12,437,119 B2
(45) Date of Patent: Oct. 7, 2025

(54) RECONFIGURABLE PUF WITH TWO PUF FUNCTIONS

(71) Applicant: Wenzhou University, Zhejiang (CN)

(72) Inventors: Pengjun Wang, Zhejiang (CN); Li Ni, Zhejiang (CN); Gang Li, Zhejiang (CN); Hao Ye, Zhejiang (CN); Cai Long Jin, Zhejiang (CN)

(73) Assignee: Wenzhou University, Zhejiang (CN)

( * ) Notice: Subject to any disclaimer, the term of this patent is extended or adjusted under 35 U.S.C. 154(b) by 96 days.

(21) Appl. No.: 18/420,636

(22) Filed: Jan. 23, 2024

(65) Prior Publication Data

US 2025/0139301 A1    May 1, 2025

(30) Foreign Application Priority Data

Oct. 27, 2023   (CN) .......................... 202311406915.8

(51) Int. Cl.
*G06F 21/75* (2013.01)
*H03K 19/0948* (2006.01)
(Continued)

(52) U.S. Cl.
CPC .......... *G06F 21/75* (2013.01); *H03K 19/0948* (2013.01); *H03K 19/17764* (2013.01); *H03K 19/17704* (2013.01); *H03K 19/17728* (2013.01)

(58) Field of Classification Search
USPC ........................................................ 726/34
See application file for complete search history.

(56) References Cited

U.S. PATENT DOCUMENTS 8,418,006 B1 * 4/2013 Trimberger ........... H04L 9/0866
                                                        716/111
10,432,198 B1 * 10/2019 Wang ........................ G06F 1/10
(Continued)

FOREIGN PATENT DOCUMENTS

CN   110648704 A  *  1/2020  ......... G11C 11/4125
CN   113168854 A  *  7/2021  ............. G11C 5/145
(Continued)

OTHER PUBLICATIONS

Jorge Guajardo et al., "FPGA Intrinsic PUFs and Their Use for IP Protection", Cryptographic Hardware and Embedded Systems—CHES 2007, Sep. 10-13, 2007, pp. 1-18.
(Continued)

*Primary Examiner* — Sakinah White Taylor
(74) *Attorney, Agent, or Firm* — JCIPRNET

(57) ABSTRACT

A reconfigurable PUF with two PUF functions comprises $2^m \times n$ PUF cells, a sequential control module, a row selection module, n amplification modules, n first bit lines, and n second bit lines. Each of the $2^m \times n$ PUF cells comprises a first PMOS transistor, a second PMOS transistor, a first NMOS transistor, a second NMOS transistor, a third NMOS transistor, a fourth NMOS transistor, a fifth NMOS transistor, a sixth NMOS transistor and a seventh NMOS transistor. The PUF cells can provide two independent responses, and can operate in a SRAM mode and an inverter mode. Therefore, the reconfigurable PUF with two PUF functions can operate both in the SRAM mode and the inverter mode, and a PUF operating mode with higher reliability is selected for generating final responses.

3 Claims, 5 Drawing Sheets

(51) Int. Cl.
*H03K 19/17704* (2020.01)
*H03K 19/17728* (2020.01)
*H03K 19/17764* (2020.01)

(56) References Cited

U.S. PATENT DOCUMENTS

| | | | | |
|---|---|---|---|---|
| 10,812,084 | B2* | 10/2020 | Strukov | G11C 16/22 |
| 2020/0014547 | A1* | 1/2020 | Lu | H04L 9/12 |
| 2020/0186350 | A1* | 6/2020 | Wentz | H04L 9/3247 |
| 2021/0135886 | A1* | 5/2021 | Lee | H04L 9/0877 |
| 2023/0266944 | A1* | 8/2023 | Ivaniuk | H04L 9/0869 |
| | | | | 708/250 |

FOREIGN PATENT DOCUMENTS

| | | | | | |
|---|---|---|---|---|---|
| CN | 117540438 | A | * | 2/2024 | G06F 21/73 |
| KR | 102430219 | B1 | * | 8/2022 | G06F 21/602 |

OTHER PUBLICATIONS

Dai Li et al., "A Self-Regulated and Reconfigurable CMOS Physically Unclonable Function Featuring Zero-Overhead Stabilization", IEEE Journal of Solid-State Circuits, Jan. 2020, pp. 98-107, vol. 55, No. 1.

\* cited by examiner

RECONFIGURABLE PUF WITH TWO PUF FUNCTIONS

CROSS-REFERENCE TO RELATED APPLICATION

This application claims the priority benefit of China application serial no. 202311406915.8, filed on Oct. 27, 2023. The entirety of the above-mentioned patent application is hereby incorporated by reference herein and made a part of this specification.

BACKGROUND

Technical Field

The invention relates to PUF circuits, in particular to a reconfigurable PUF with two PUF functions.

Description of Related Art

The Internet of Things (IoT) is a network that connects devices through the internet by means of sensing equipment for information exchange and communication to realize intelligent recognition, positioning, tracking, monitoring and management of the devices. The IoT improves the level of intelligence of daily life and promotes industrial development. However, the increase of intelligent equipment connected to the IoT brings increasingly severe challenges in security and privacy. In addition, since the memory, CPU, power and other resources of the IoT are seriously limited, it becomes especially important to provide a safe and lightweight key storage solution.

The physical unclonable functions (PUF), as a chip fingerprint, can generate a unique identity tag by means of a process variation during chip fabrication. Therefore, the PUF can be effectively applied to chip anti-counterfeit, key generation, and other fields.

Guajardo et al., proposed, in Literature GUAJARDO J, KUMAR S S, SCHRIJEN G J, et al. *FPGA intrinsic PUFs and their use for IP protection*[C]. *Cryptographic Hardware and Embedded Systems—CHES*, 2007:63-80., a SRAM PUF, which acquires PUF responses according to the initial state when the SRAM is powered on. The PUF responses are depending on the mismatches between the cross-coupled inverters. However, the cross-coupled inverters will also amplify noise when amplifying the process variation, resulting in low reliability of the SRAM PUF. Li et al., proposed, in Literature LI D, YANG K. *A self-regulated and reconfigurable CMOS physically unclonable function featuring zero-overhead stabilization*[J]. *IEEE Journal of Solid-State Circuits*, 2020, 55(1): 98-107., a PUF circuit, PUF cells of which regulate a partial voltage of a circuit by means of bias NMOSs to bias an inverter to a sub-threshold region, the process variation is amplified by means of a high-gain characteristic of the inverter in the sub-threshold region, and the inverter outputs a voltage under the influence of a random process variation; if the output voltage is greater than a threshold of the next stage of inverter chain, the response output by the PUF cell is logic 1; otherwise, the response output by the PUF cell is logic 0. However, with the change of temperature and voltage, the threshold of the inverter chain will change, and the response output by the PUF cell will flip quickly, reducing the reliability of the PUF response.

SUMMARY

The technical issue to be settled by the invention is to provide a reconfigurable PUF with two PUF functions.

The technical solution adopted by the invention to settle the above technical issue is as follows: a reconfigurable PUF with two PUF functions comprises $2^m \times n$ PUF cells, a sequential control module, a row selection module, n amplification modules, n first bit lines, and n second bit lines, wherein m is an integer greater than or equal to 1, n is an integer greater than or equal to 1, the row selection module has an enable terminal, m output terminals, $2^m$ first output terminals and $2^m$ second output terminals, m bits of row selection signals are input to the m input terminals of the row selection module, the row selection module is configured to convert the m bits of row selection signals into $2^m$ bits of row address signals and $2^m$ bits of row initialization signals, output the $2^m$ bits of row address signals via the $2^m$ first output terminals thereof, and output the $2^m$ bits of row initialization signals via the $2^m$ second output terminals thereof, the $2^m$ bits of row address signals and the $2^m$ bits of row initialization signals are all binary data, only one bit of data in the $2^m$ bits of row address signals is 1, the other bits of data of the $2^m$ bits of row address signals are all 0, only one bit of data of the $2^m$ bits of row initialization signals is 0, the other bits of data of the $2^m$ bits of row initialization signals are all 1, the $k^{th}$ bit of data of the $2^m$ bits of row address signals is output via the $k^{th}$ first output terminal of the row selection module, the $k^{th}$ bit of data of the $2^m$ bits of row initialization signals is output via the $k^{th}$ second output terminal of the row selection module, the $k^{th}$ bit of data of the $2^m$ bits of row address signals is different from the $k^{th}$ bit of data of the $2^m$ bits of row initialization signals, and k=1, 2, ..., $2^m$; each amplification module has an enable terminal, a first input terminal, a second input terminal and an output terminal; the sequential control module has a first control terminal and a second control terminal, and is configured to generate two paths of enable signals for controlling sequential matching of the row selection module and the n amplification modules, wherein a first path of enable signal is output via the first control terminal of the sequential control module, and a second path of enable signal is output via the second control terminal of the sequential control module; the $2^m \times n$ PUF cells are distributed in $2^m$ rows and n columns to form a PUF array; each PUF cell has a power terminal, a first input terminal, a second input terminal, a third input terminal, a first output terminal and a second output terminal; the first control terminal of the sequential control module is connected to the enable terminal of the row selection module, the second control terminal of the sequential control module is connected to the enable terminals of the n amplification modules, the $k^{th}$ first output terminal of the row selection module is connected to the first input terminals of the n PUF cells in the $k^{th}$ row of the PUF array, the $k^{th}$ second output terminal of the row selection module is connected to the second input terminals of the n PUF cells in the $k^{th}$ row of the PUF array, the first output terminals of the $2^m$ PUF cells in the $j^{th}$ column of the PUF array are all connected to the $j^{th}$ first bit line, the $j^{th}$ first bit line is connected to the first input terminal of the $j^{th}$ amplification module, the second output terminals of the $2^m$ PUF cells in the $j^{th}$ column of the PUF array are all connected to the $j^{th}$ second bit line, the $j^{th}$ second bit line is connected to the second input terminal of the $j^{th}$ amplification module, and j=1, 2, ..., n; when data input to the first input terminals of the n PUF cells in one row of the PUF array is 1 and data input to the second input terminals of the n PUF cells in said row of the PUF array is 0, the n PUF cells enter an operating state, the first output terminal and the second output terminal of each PUF cell in said row respectively generate and output voltage signals, all the PUF cells in the other rows enter a dormant state, and the first output terminals and the second output terminals of the PUF cells in the other rows do not output voltage signals; each PUF cell comprises a first PMOS transistor, a second PMOS transistor, a first NMOS transistor, a second NMOS transistor, a third NMOS transistor, a fourth NMOS transistor, a fifth NMOS transistor, a sixth NMOS transistor and a seventh NMOS transistor, wherein a source of the first PMOS transistor and a source of the second PMOS transistor are connected and a connecting terminal thereof is the power terminal of the PUF cell, a gate of the first PMOS transistor, a drain of the second PMOS transistor, a drain of the sixth NMOS transistor, a source of the fourth NMOS transistor, a gate of the second NMOS transistor, a drain of the first NMOS transistor and a drain of the third NMOS transistor are connected, a drain of the first PMOS transistor, a gate of the second PMOS transistor, a source of the fifth NMOS transistor, a drain of the second NMOS transistor, a drain of the seventh NMOS transistor, a drain of the fourth NMOS transistor and a gate of the third NMOS transistor are connected, a gate of the first NMOS transistor and a gate of the seventh NMOS transistor are connected and a connecting terminal thereof is the second input terminal of the PUF cell, a source of the first NMOS transistor, a source of the third NMOS transistor, a source of the second NMOS transistor and a source of the seventh NMOS transistor are all grounded, a gate of the fourth NMOS transistor is the third input terminal of the PUF cell, a gate of the fifth NMOS transistor and a gate of the sixth NMOS transistor are connected and a connecting terminal thereof is the first input terminal of the PUF cell, a drain of the fifth NMOS transistor is the first output terminal of the PUF cell, and a source of the sixth NMOS transistor is the second output terminal of the PUF cell; the reconfigurable PUF with two PUF functions further comprises a bit configuration circuit and a biasing circuit, wherein the bit configuration circuit has n output terminals, the $j^{th}$ output terminal of the bit configuration circuit is connected to the third input terminals of the $2^m$ PUF cells in the $j^{th}$ column of the PUF cell, the bit configuration circuit is configured to generate n bits of binary configuration signals, and the $j^{th}$ bit of the n bits of binary configuration signals is output via the $j^{th}$ output terminal of the bit configuration circuit; when the $j^{th}$ bit of the n bits of binary configuration signals is 1, the $2^m$ PUF cells in the $j^{th}$ column of the PUF cell are configured to be in an inverter mode; when the $j^{th}$ bit of the n bits of binary configuration signals is 0, the $2^m$ PUF cells in the $j^{th}$ column of the PUF cells are configured to be in a SRAM mode; the biasing circuit has n output terminals, the $j^{th}$ output terminal of the biasing circuit is connected to the power terminals of the $2^m$ PUF cells in the $j^{th}$ column of the PUF cell, the biasing circuit is configured to generate n paths of bias voltages, wherein the $n^{th}$ path of bias voltage is output via the $j^{th}$ output terminal of the biasing circuit;

When one PUF cell enters the operating state and is in the SRAM mode, a large voltage deviation will be generated due to the cross-coupled inverters competition between the first bit line and the second bit line which are connected to the first output terminal and the second output terminal of said PUF cell, wherein the first bit line theoretically generates a voltage equal to a bias voltage input to the power terminal of said PUF cell and the second bit line theoretically generate a voltage 0; however, due to the presence of a process variation during circuit fabrication, the voltage generated by the first bit line is close to the bias voltage, the voltage generated by the second bit line is close to 0, and in this case, the output terminal of the amplification module connected to the first bit line and the second bit line outputs 1;

When one PUF cell enters the operating state and is in the inverter mode, the first bit line and the second bit line which are connected to the first output terminal and the second output terminal of said PUF cell respectively generate a voltage equal to half of the bias voltage input to the power terminal of the PUF cell; however, due to the presence of a process variation during circuit fabrication, the voltage generated by the first bit line is close to half of the bias voltage, the voltage generated by the second bit line is close to half of the bias voltage, and the voltage generated by the first bit line is not equal to the voltage generated by the second bit line; in this case, if the voltage generated by the first bit line is greater than half of the bias voltage, the output terminal of the amplification module connected to the first bit line and the second bit line outputs 1; if the voltage generated by the first bit line is less than half of the bias voltage, the output terminal of the amplification module connected to the first bit line and the second bit line outputs 0;

In the PUF array, instable PUF cells are in the inverter mode after entering the operating state, and stable PUF cells are in the SRAM mode after entering the operating state.

The row selection module is realized by a decoder.

The amplification module comprises a third PMOS transistor, a fourth PMOS transistor, a fifth PMOS transistor, a sixth PMOS transistor, a seventh PMOS transistor, an eighth PMOS transistor, a ninth PMOS transistor, a tenth PMOS transistor, an eleventh PMOS transistor, a twelfth PMOS transistor, a thirteenth PMOS transistor, a fourteenth PMOS transistor, an eighth NMOS transistor, a ninth NMOS transistor, a tenth NMOS transistor, an eleventh NMOS transistor, a twelfth NMOS transistor, a thirteenth NMOS transistor, a fourteenth NMOS transistor and a fifteenth NMOS transistor; a supply voltage VDD is accessed to a source of the third PMOS transistor, a source of the sixth PMOS transistor, a source of the ninth PMOS transistor and a source of the twelfth PMOS transistor, a gate of the third PMOS transistor, a gate of the sixth PMOS transistor, a gate of the ninth PMOS transistor and a gate of the twelfth PMOS transistor are connected and a connecting terminal thereof is the enable terminal of the amplification module, a drain of the third PMOS transistor and a source of the fourth PMOS transistor are connected, a drain of the sixth PMOS transistor and a source of the seventh PMOS transistor are connected, a drain of the fourth PMOS transistor and a source of the fifth PMOS transistor are connected, a drain of the seventh PMOS transistor and a source of the eighth PMOS transistor are connected, a gate of the fourth PMOS transistor, a gate of the fifth PMOS transistor, a gate of the eighth NMOS transistor and a gate of the ninth NMOS transistor are connected and a connecting terminal thereof is the first input terminal of the amplification module, a drain of the fifth PMOS transistor, a drain of the eight NMOS transistor, a gate of the seventh PMOS transistor, a gate of the eighth PMOS transistor, a gate of the tenth NMOS transistor and a gate of the eleventh NMOS transistor are connected, a drain of the eighth PMOS transistor and a drain of the tenth NMOS transistor are connected and a connecting terminal thereof is the output terminal of the amplification module, a source of the eighth NMOS transistor and a drain of the ninth NMOS transistor are connected, a source of the ninth NMOS transistor is grounded, a source of the tenth NMOS transistor and a drain of the eleventh NMOS transistor are connected, and a source of the eleventh NMOS transistor is grounded; a drain of the ninth PMOS transistor and a source of the tenth PMOS transistor are connected, a drain of the twelfth PMOS transistor and a source of the thirteenth PMOS transistor are connected, a drain of the tenth PMOS transistor and a source of the eleventh PMOS transistor are connected, a drain of the thirteenth PMOS transistor and a source of the fourteenth PMOS transistor are connected, a gate of the tenth PMOS transistor, a gate of the eleventh PMOS transistor, a gate of the twelfth NMOS transistor and a gate of the thirteenth NMOS transistor are connected and a connecting terminal thereof is the second input terminal of the amplification module, a drain of the eleventh PMOS transistor, a drain of the twelfth NMOS transistor, a gate of the thirteenth PMOS transistor, a gate of the fourteenth PMOS transistor, a gate of the fourteenth NMOS transistor and a gate of the fifteenth NMOS transistor are connected, a drain of the fourteenth PMOS transistor and a drain of the fourteenth NMOS transistor are connected, a source of the twelfth NMOS transistor and a drain of the thirteenth NMOS transistor are connected, a source of the thirteenth NMOS transistor is grounded, a source of the fourteenth NMOS transistor and a drain of the fifth NMOS transistor are connected, and a source of the fifteenth NMOS transistor is grounded. In the amplification module, the third PNMOS transistor, the fourth PMOS transistor, the fifth PMOS transistor, the sixth PMOS transistor, the seventh PMOS transistor, the eighth PMOS transistor, the eighth NMOS transistor, the ninth NMOS transistor, the tenth NMOS transistor and the eleventh NMOS transistor form a first amplifier, and the ninth PMOS transistor, the tenth PMOS transistor, the eleventh PMOS transistor, the twelfth PMOS transistor, the thirteenth PMOS transistor, the fourteenth PMOS transistor, the twelfth NMOS, the thirteenth NMOS transistor, the fourteenth NMOS transistor and the fifth NMOS transistor form a second amplifier; the second amplifier guarantees a fair competition of the PUF cell, and the first amplifier and the second amplifier identical with the first amplifier guarantee the randomness of the PUF cell; when the second path of enable signal PRE output by the sequential control module is 1, the third PMOS transistor, the sixth PMOS transistor, the ninth PMOS transistor and the twelfth PMOS transistor are turned off, the eighth NMOS transistor, the ninth NMOS transistor, the tenth NMOS transistor, the eleventh NMOS transistor, the twelfth NMOS transistor, the thirteenth NMOS transistor, the fourteenth NMOS transistor and the fifth NMOS transistor leak a current, the amplification module does not operate, and the output terminal of the amplification module output 0; when the second path of enable signal PRE output by the sequential control module is 0, the third PMOS transistor, the sixth PMOS transistor, the ninth PMOS transistor and the twelfth PMOS transistor are turned on, and the amplification module enters the operating state; when a voltage accessed to the first input terminal of the amplification module is greater than half of the bias voltage accessed to the power terminal of the PUF cell connected to the amplification module, the fourth PMOS transistor, the fifth PMOS transistor, the tenth PMOS transistor and the eleventh PMOS transistor are turned off, and the output terminal of the amplification module outputs 1; when the voltage accessed to the first input terminal of the amplification module is less than half of the bias voltage accessed to the power terminal of the PUF cell connected to the amplification module, the eighth NMOS transistor, the ninth NMOS transistor, the seventh PMOS transistor and the eighth PMOS transistor are turned off, and the output terminal of the amplification module outputs 0; when a voltage accessed to the second input terminal of the amplification module is greater than half of the bias voltage accessed to the power terminal of the PUF cell connected to the amplification module, the tenth PMOS transistor, the eleventh PMOS transistor, the fourteenth NMOS transistor and the fifth NMOS transistor are turned off, an output of the output terminal of the amplification module has no influence; and when the voltage accessed to the second input terminal of the amplification module is less than half of the bias voltage accessed to the power terminal of the PUF cell connected to the amplification module, the twelfth NMOS transistor, the thirteenth PMOS transistor nd the fourteenth PMOS transistor are turned off, and an output of the output terminal of the amplification module has no influence.

Compared with the prior art, the invention has the following advantages: the PUF cell is formed by a first PMOS transistor, a second PMOS transistor, a first NMOS transistor, a second NMOS transistor, a third NMOS transistor, a fourth NMOS transistor, a fifth NMOS transistor, a sixth NMOS transistor and a seventh NMOS transistor, can provide two independent responses, and can operate in a SRAM mode and an inverter mode. Therefore, the reconfigurable PUF with two PUF functions can operate both in the SRAM mode and the inverter mode, and a PUF operating mode with higher reliability is selected for generating final responses, thus effectively improving the reliability of the responses.

DESCRIPTION OF THE EMBODIMENTS

The invention will be described in further detail below in conjunction with accompanying drawings and embodiments.

Figure 1:
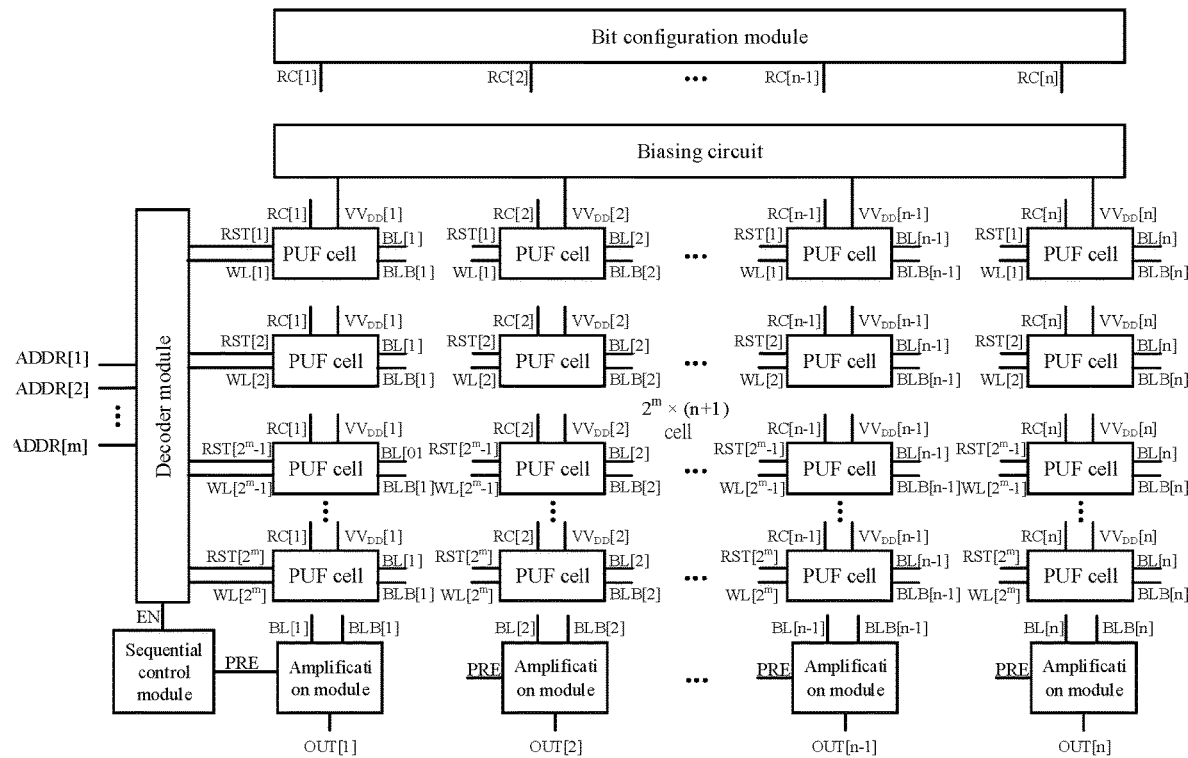
FIG. 1 is a structural block diagram of a reconfigurable PUF with two PUF functions according to the invention.
Figure 2:
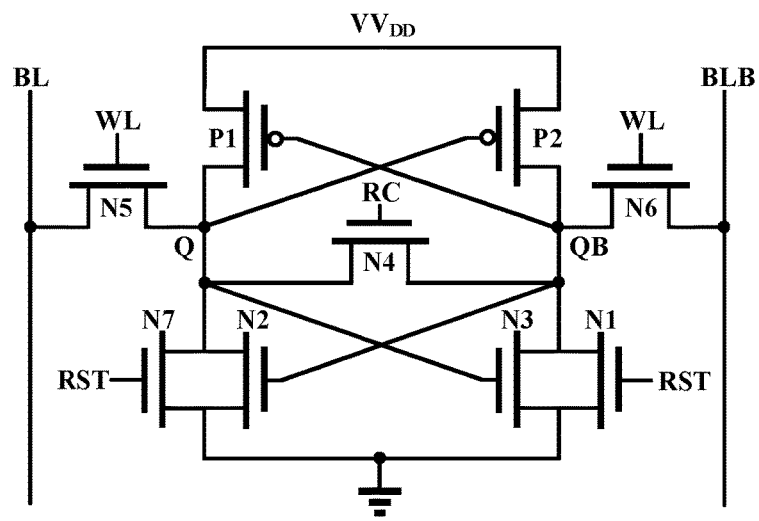
FIG. 2 is a circuit diagram of a PUF cell of the reconfigurable PUF with two PUF functions according to the invention.

Embodiment 1: As shown in FIG. 1 and FIG. 2, a reconfigurable PUF with two PUF functions comprises $2^m \times n$ PUF cells, a sequential control module, a row selection module, n amplification modules, n first bit lines BL[1], BL[2], . . . , BL[n], and n second bit lines BLB[1], BLB[2], . . . , BLB[n], wherein m is an integer greater than or equal to 1, n is an integer greater than or equal to 1, the row selection module has an enable terminal, m output terminals, $2^m$ first output terminals and $2^m$ second output terminals, m bits of row selection signals are input to the m input terminals of the row selection module, the row selection module is configured to convert the m bits of row selection signals ADDR[1], ADDR[2], . . . , ADDR[m] into $2^m$ bits of row address signals WL[1], WL[2], . . . , WL[$2^m$] and $2^m$ bits of row initialization signals RST[1], RST[2], . . . , RST[$2^m$], output the $2^m$ bits of row address signals WL[1], WL[2], . . . , WL[$2^m$] via the $2^m$ first output terminals thereof, and output the $2^m$ bits of row initialization signals RST[1], RST[2], . . . , RST[$2^m$] via the $2^m$ second output terminals thereof, the $2^m$ bits of row address signals and the $2^m$ bits of row initialization signals are all binary data, only one bit of data in the $2^m$ bits of row address signals is 1, the other bits of data of the $2^m$ bits of row address signals are all 0, only one bit of data of the $2^m$ bits of row initialization signals is 0, the other bits of data of the $2^m$ bits of row initialization signals are all 1, the $k^{th}$ bit of data WL[k] of the $2^m$ bits of row address signals is output via the $k^{th}$ first output terminal of the row selection module, the $k^{th}$ bit of data RST[k] of the $2^m$ bits of row initialization signals is output via the $k^{th}$ second output terminal of the row selection module, the $k^{th}$ bit of data WL[k] of the $2^m$ bits of row address signals is different from the $k^{th}$ bit of data RST[k] of the $2^m$ bits of row initialization signals, and k=1, 2, . . . , $2^m$; each amplification module has an enable terminal, a first input terminal, a second input terminal and an output terminal; the sequential control module has a first control terminal and a second control terminal, and is configured to generate two paths of enable signals for controlling sequential matching of the row selection module and the n amplification modules, wherein a first path of enable signal is output via the first control terminal of the sequential control module, and a second path of enable signal is output via the second control terminal of the sequential control module; the $2^m \times n$ PUF cells are distributed in $2^m$ rows and n columns to form a PUF array; each PUF cell has a power terminal, a first input terminal, a second input terminal, a third input terminal, a first output terminal and a second output terminal; the first control terminal of the sequential control module is connected to the enable terminal of the row selection module, the second control terminal of the sequential control module is connected to the enable terminals of the n amplification modules, the $k^{th}$ first output terminal of the row selection module is connected to the first input terminals of the n PUF cells in the $k^{th}$ row of the PUF array, the $k^{th}$ second output terminal of the row selection module is connected to the second input terminals of the n PUF cells in the $k^{th}$ row of the PUF array, the first output terminals of the $2^m$ PUF cells in the $j^{th}$ column of the PUF array are all connected to the $j^{th}$ first bit line BL[j], the $j^{th}$ first bit line BL[j] is connected to the first input terminal of the $j^{th}$ amplification module, the second output terminals of the $2^m$ PUF cells in the $j^{th}$ column of the PUF array are all connected to the $j^{th}$ second bit line BLB[j], the $j^{th}$ second bit line BLB[j] is connected to the second input terminal of the $j^{th}$ amplification module, and j=1, 2, . . . , n; when data input to the first input terminals of the n PUF cells in one row of the PUF array is 1 and data input to the second input terminals of the n PUF cells in said row of the PUF array is 0, the n PUF cells enter an operating state, the first output terminal and the second output terminal of each PUF cell in said row respectively generate and output voltage signals, all the PUF cells in the other rows enter a dormant state, and the first output terminals and the second output terminals of the PUF cells in the other rows do not output voltage signals; each PUF cell comprises a first PMOS transistor P1, a second PMOS transistor P2, a first NMOS transistor N1, a second NMOS transistor N2, a third NMOS transistor N3, a fourth NMOS transistor N4, a fifth NMOS transistor N5, a sixth NMOS transistor N6 and a seventh NMOS transistor N7, wherein a source of the first PMOS transistor P1 and a source of the second PMOS transistor P2 are connected and a connecting terminal thereof is the power terminal of the PUF cell, a gate of the first PMOS transistor P1, a drain of the second PMOS transistor P2, a drain of the sixth NMOS transistor N6, a source of the fourth NMOS transistor N4, a gate of the second NMOS transistor N2, a drain of the first NMOS transistor N1 and a drain of the third NMOS transistor N3 are connected, a drain of the first PMOS transistor P1, a gate of the second PMOS transistor P2, a source of the fifth NMOS transistor N5, a drain of the second NMOS transistor N2, a drain of the seventh NMOS transistor N7, a drain of the fourth NMOS transistor N4 and a gate of the third NMOS transistor N3 are connected, a gate of the first NMOS transistor N1 and a gate of the seventh NMOS transistor N7 are connected and a connecting terminal thereof is the second input terminal of the PUF cell, a source of the first NMOS transistor N1, a source of the third NMOS transistor N3, a source of the second NMOS transistor N2 and a source of the seventh NMOS transistor N7 are all grounded, a gate of the fourth NMOS transistor N4 is the third input terminal of the PUF cell, a gate of the fifth NMOS transistor N5 and a gate of the sixth NMOS transistor N6 are connected and a connecting terminal thereof is the first input terminal of the PUF cell, a drain of the fifth NMOS transistor N5 is the first output terminal of the PUF cell, and a source of the sixth NMOS transistor N6 is the second output terminal of the PUF cell; the reconfigurable PUF with two PUF functions further comprises a bit configuration circuit and a biasing circuit, wherein the bit configuration circuit has n output terminals, the $j^{th}$ output terminal of the bit configuration circuit is connected to the third input terminals of the $2^m$ PUF cells in the $j^{th}$ column of the PUF cell, the bit configuration circuit is configured to generate n bits of binary configuration signals RC[1], RC[2], . . . , RC[n], and the $j^{th}$ bit RC[j] of the n bits of binary configuration signals is output via the $j^{th}$ output terminal of the bit configuration circuit; when the $j^{th}$ bit RC[j] of the n bits of binary configuration signals is 1, the $2^m$ PUF cells in the $j^{th}$ column of the PUF cell are configured to be in an inverter mode; when the $j^{th}$ bit RC[j] of the n bits of binary configuration signals is 0, the $2^m$ PUF cells in the $j^{th}$ column of the PUF cell are configured to be in an SRAM mode; the biasing circuit has n output terminals, the $j^{th}$ output terminal of the biasing circuit is connected to the power terminals of the $2^m$ PUF cells in the $j^{th}$ column of the PUF cell, the biasing circuit is configured to generate n paths of bias voltages VVDD[1], VVDD[2], . . . , VVDD[n], wherein the $n^{th}$ path of bias voltage VVDD[j] is output via the $j^{th}$ output terminal of the biasing circuit;

When one PUF cell enters the operating state and is in the SRAM mode, a large voltage deviation will be generated due to a cross-coupling competition between the first bit line and the second bit line which are connected to the first output terminal and the second output terminal of said PUF cell, wherein the first bit line theoretically generates a voltage equal to a bias voltage input to the power terminal of said PUF cell, and the second bit line theoretically generate a voltage 0; however, due to the presence of a process deviation during circuit fabrication, the voltage generated by the first bit line is close to the bias voltage, the voltage generated by the second bit line is close to 0, and in this case, the output terminal of the amplification module connected to the first bit line and the second bit line outputs 1; when one PUF cell enters the operating state and is in the inverter mode, the first bit line and the second bit line which are connected to the first output terminal and the second output terminal of said PUF cell respectively generate a voltage equal to half of the bias voltage input to the power terminal of the PUF cell; however, due to the presence of a process variation during circuit fabrication, the voltage generated by the first bit line is close to half of the bias voltage, the voltage generated by the second bit line is close to half of the bias voltage, and the voltage generated by the first bit line is not equal to the voltage generated by the second bit line; in this case, if the voltage generated by the first bit line is greater than half of the bias voltage, the output terminal of the amplification module connected to the first bit line and the second bit line outputs 1; if the voltage generated by the first bit line is less than half of the bias voltage, the output terminal of the amplification module connected to the first bit line and the second bit line outputs 0; in the PUF array, instable PUF cells are in the inverter mode after entering the operating state, and stable PUF cells are in the SRAM mode after entering the operating state.

Whether the PUF cells are stable (reliable) is determined as follows: first, the n bits of binary configuration signals RC[1], RC[2], . . . , RC[n] are all initialized to logic 0, at this moment, all the PUF cells are configured to be in the SRAM mode, responses of the PUF cells (signals output by the output terminals of the corresponding amplification modules) are extracted multiple times, a logic value with a higher generation frequency is selected by an odd number of tests to be used as a final output (TMV), and a stable response of each PUF cell is extracted according to the TMV; then, under a temperature from −55° C. to 125° C. and a voltage from 0.7 V to 1.4 V, the PUF cells are scanned multiple times, and responses of the PUF cells are recorded; if the response of one PUF cell does not flip during the test, said PUF cell is considered as stable; otherwise, said PUF cell is considered as instable. After whether the PUF cells are stable is determined, correspondingly n bits of binary configuration signals RC[1], RC[2], . . . , RC[n] are obtained according to preset m bits of selection signals ADDR[1], ADDR[2], . . . , ADDR[m] and are stored in the bit configuration module, such that stable PUF cells are in the SRAM mode after entering the operating state, and instable PUF cells are in the inverter mode after entering the operating state. Because the n bits of binary configuration signals RC[1], RC[2], . . . , RC[n] indicates whether the PUF cells are stable, response values of the PUF cells cannot be deduced based on the n bits of binary configuration signals RC[1], RC[2], . . . , RC[n], that is, output responses of the PUF with two reconfigurable PUF functions cannot be deduced from the n bits of binary configuration signals RC[1], RC[2], . . . , RC[n] stored in the bit configuration module, and thus, the security of the reconfigurable PUF with two PUF functions will not be affected by leakage of the n bits of binary configuration signals RC[1], RC[2], . . . , RC[n] leak.

In this embodiment, the row selection module is realized by a decoder.

Figure 3:
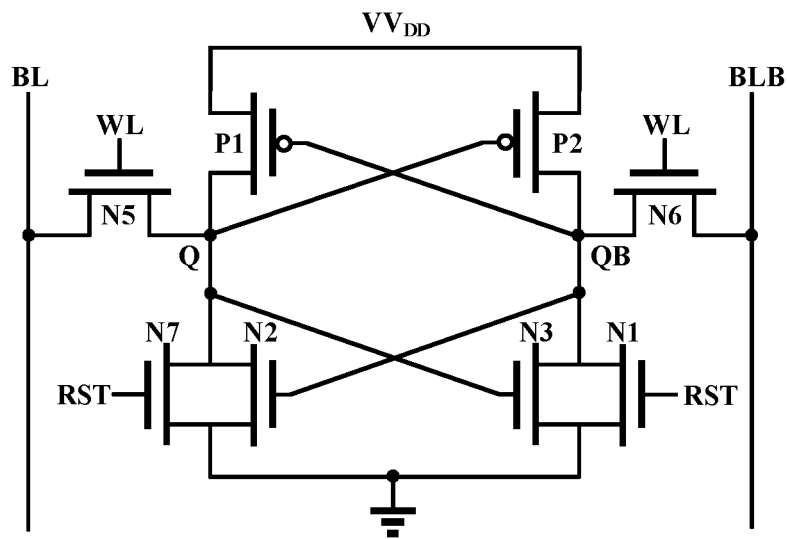
FIG. 3 is an equivalent circuit diagram of the PUF cell of the reconfigurable PUF with two PUF functions in an SRAM mode according to the invention.

As shown in FIG. 3, when the PUF cell operates in the SRAM mode, a low-level voltage (logic 0) is accessed to the third input terminal of the PUF cell (the gate of the fourth NMOS transistor), at this moment, the fourth NMOS transistor N4 is turned off, which is equivalent to that the fourth NMOS transistor N4 does not exist, and the first PMOS transistor P1, the second PMOS transistor P2, the second NMOS transistor N2 and the third NMOS transistor N2 form a traditional SRAM PUF. The bias voltage VVDD accessed to the power terminal of the PUF cell synchronously charges a node Q and a node QB, the voltage between the gate and the source of the first PMOS transistor P1 and the second PMOS transistor P2 decreases continuously, which is manifested as a continuous decrease of a current $I_D$ across the first PMOS transistor P1 and the second PMOS transistor P2. Under a desired condition, the voltage of the node Q and the voltage of the node QB will stay at an intermediate level (VVDD/2). Due to the inevitable process deviation of the transistors, the charging rate of the node Q is different from the charging rate of the node QB. Assume the charging rate of the node Q is greater than that of the node QB, the node Q will reach the intermediate level before the node QB. The voltage of the node Q will rise continuously and be fed back to the gate of the second PMOS transistor P2 and the gate of the third NMOS transistor, which in turn reduces the driving capacity of the second PMOS transistor P2, leading to a decrease of the voltage of the node QB. In this way, a negative feedback is formed to allow the PUF cell circuit to be finally stabilized at the node Q which is at a high level (close to VVDD/2), the node QB is at a low level (close to 0), at this moment, the first bit line connected to the first output terminal of the PUF cell generates a high level (logic 1), and the second bit line connected to the second output terminal of the PUF cell generates a low level (logic 0).

Figure 4:
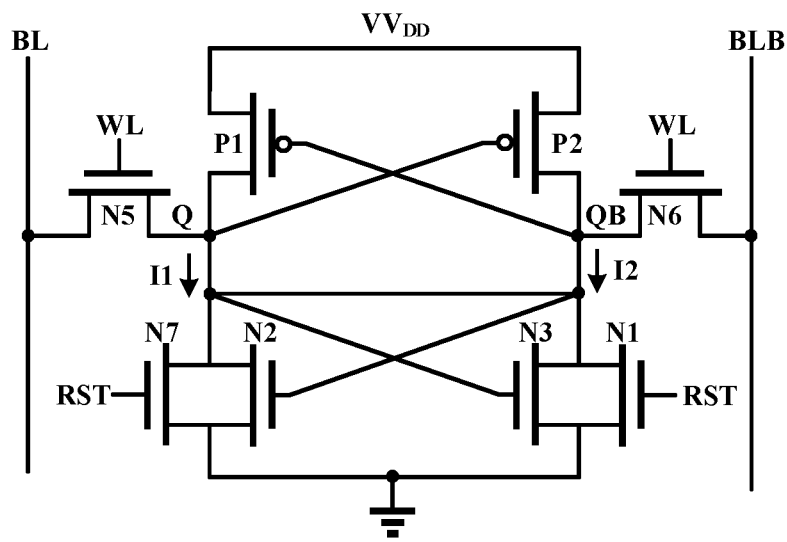
FIG. 4 is an equivalent circuit diagram of the PUF cell of the reconfigurable PUF with two PUF functions in an inverter mode according to the invention.

As shown in FIG. 4, when the PUF cell operates in the inverter mode, a high-level voltage (logic 1) is accessed to the third input terminal of the PUF cell (the gate of the fourth NMOS transistor), at this moment, the fourth NMOS transistor N4 is turned on, which is equivalent to that the node Q and the node QB are turned on; under a desired condition, the voltage of the node Q and the voltage of the node QB will be stabilized at an intermediate level (VVDD/2); however, due to the existence of the process deviation, the voltage of the node Q and the voltage of the QB will be close to the intermediate level (VVDD/2) respectively, and the voltage of the node Q and the voltage of the node QB are respectively output through the first bit line and the second bit line which are connected to the first output terminal of the PUF cells.

Figure 5:
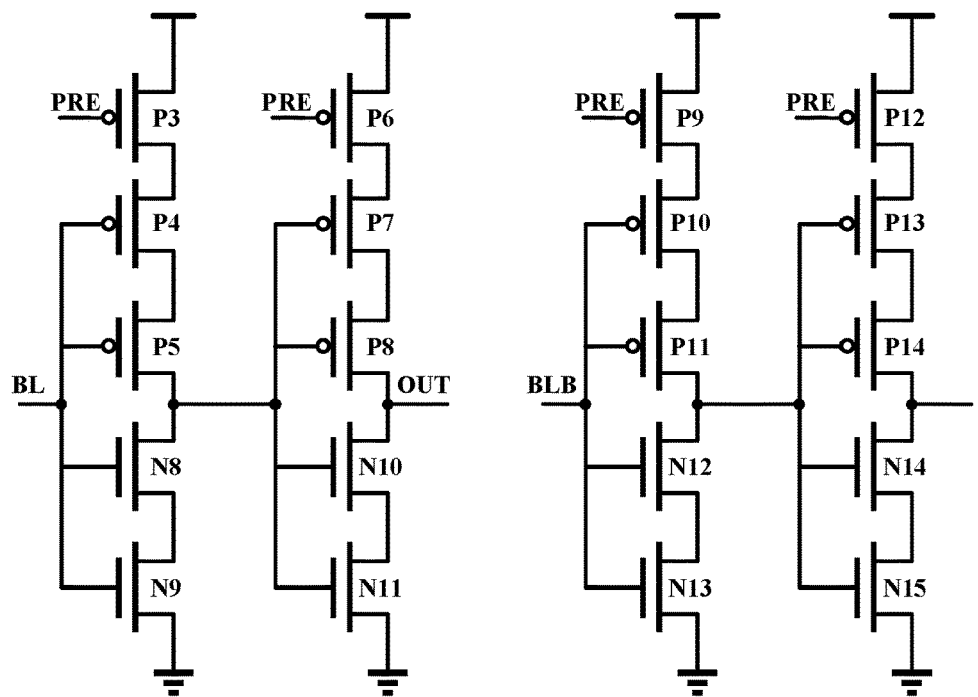
FIG. 5 is a circuit diagram of an amplification module of the reconfigurable PUF with two PUF functions according to the invention.

Embodiment 2: This embodiment is basically the same as Embodiment 1 and differs from Embodiment 1 in the following aspects: in this embodiment, as shown in FIG. 5, the amplification module comprises a third PMOS transistor P3, a fourth PMOS transistor P4, a fifth PMOS transistor P5, a sixth PMOS transistor P6, a seventh PMOS transistor P7, an eighth PMOS transistor P8, a ninth PMOS transistor P9, a tenth PMOS transistor P10, an eleventh PMOS transistor P11, a twelfth PMOS transistor P12, a thirteenth PMOS transistor P13, a fourteenth PMOS transistor P14, an eighth NMOS transistor N8, a ninth NMOS transistor N9, a tenth NMOS transistor N10, an eleventh NMOS transistor N11, a twelfth NMOS transistor N12, a thirteenth NMOS transistor N13, a fourteenth NMOS transistor N14 and a fifteenth NMOS transistor N15; a supply voltage VDD is accessed to a source of the third PMOS transistor P3, a source of the sixth PMOS transistor P6, a source of the ninth PMOS transistor P9 and a source of the twelfth PMOS transistor P12, a gate of the third PMOS transistor P3, a gate of the sixth PMOS transistor P6, a gate of the ninth PMOS transistor P9 and a gate of the twelfth PMOS transistor P12 are connected and a connecting terminal thereof is the enable terminal of the amplification module, a drain of the third PMOS transistor P3 and a source of the fourth PMOS transistor P4 are connected, a drain of the sixth PMOS transistor P6 and a source of the seventh PMOS transistor P7 are connected, a drain of the fourth PMOS transistor P4 and a source of the fifth PMOS transistor P5 are connected, a drain of the seventh PMOS transistor P7 and a source of the eighth PMOS transistor P8 are connected, a gate of the fourth PMOS transistor P4, a gate of the fifth PMOS transistor P5, a gate of the eighth NMOS transistor N8 and a gate of the ninth NMOS transistor N9 are connected and a connecting terminal thereof is the first input terminal of the amplification module, a drain of the fifth PMOS transistor P5, a drain of the eight NMOS transistor N8, a gate of the seventh PMOS transistor P7, a gate of the eighth PMOS transistor P8, a gate of the tenth NMOS transistor N10 and a gate of the eleventh NMOS transistor N11 are connected, a drain of the eighth PMOS transistor P8 and a drain of the tenth NMOS transistor N10 are connected and a connecting terminal thereof is the output terminal of the amplification module, a source of the eighth NMOS transistor N8 and a drain of the ninth NMOS transistor N9 are connected, a source of the ninth NMOS transistor N9 is grounded, a source of the tenth NMOS transistor N10 and a drain of the eleventh NMOS transistor N11 are connected, and a source of the eleventh NMOS transistor N11 is grounded; a drain of the ninth PMOS transistor P9 and a source of the tenth PMOS transistor P10 are connected, a drain of the twelfth PMOS transistor P12 and a source of the thirteenth PMOS transistor P13 are connected, a drain of the tenth PMOS transistor P10 and a source of the eleventh PMOS transistor P11 are connected, a drain of the thirteenth PMOS transistor P13 and a source of the fourteenth PMOS transistor P14 are connected, a gate of the tenth PMOS transistor P10, a gate of the eleventh PMOS transistor P11, a gate of the twelfth NMOS transistor P12 and a gate of the thirteenth NMOS transistor P13 are connected and a connecting terminal thereof is the second input terminal of the amplification module, a drain of the eleventh PMOS transistor P11, a drain of the twelfth NMOS transistor N12, a gate of the thirteenth PMOS transistor P13, a gate of the fourteenth PMOS transistor P14, a gate of the fourteenth NMOS transistor N14 and a gate of the fifteenth NMOS transistor N15 are connected, a drain of the fourteenth PMOS transistor P14 and a drain of the fourteenth NMOS transistor N14 are connected, a source of the twelfth NMOS transistor N12 and a drain of the thirteenth NMOS transistor N13 are connected, a source of the thirteenth NMOS transistor N13 is grounded, a source of the fourteenth NMOS transistor N14 and a drain of the fifth NMOS transistor N15 are connected, and a source of the fifteenth NMOS transistor N15 is grounded.

In this embodiment, in the amplification module, the third PNMOS transistor P3, the fourth PMOS transistor P4, the fifth PMOS transistor P5, the sixth PMOS transistor P6, the seventh PMOS transistor P7, the eighth PMOS transistor P8, the eighth NMOS transistor N8, the ninth NMOS transistor N9, the tenth NMOS transistor N10 and the eleventh NMOS transistor N11 form a first amplifier, and the ninth PMOS transistor P9, the tenth PMOS transistor P10, the eleventh PMOS transistor P11, the twelfth PMOS transistor P12, the thirteenth PMOS transistor P13, the fourteenth PMOS transistor P14, the twelfth NMOS N12, the thirteenth NMOS transistor N13, the fourteenth NMOS transistor N14 and the fifth NMOS transistor N15 form a second amplifier; the second amplifier guarantees a fair competition of the PUF cell, and the first amplifier and the second amplifier identical with the first amplifier guarantee the randomness of the PUF cell; when the second path of enable signal PRE output by the sequential control module is 1, the third PMOS transistor P3, the sixth PMOS transistor P6, the ninth PMOS transistor P9 and the twelfth PMOS transistor P12 are turned off, the eighth NMOS transistor N8, the ninth NMOS transistor N9, the tenth NMOS transistor N10, the eleventh NMOS transistor N11, the twelfth NMOS transistor N12, the thirteenth NMOS transistor N13, the fourteenth NMOS transistor N14 and the fifth NMOS transistor N15 leak a current, the amplification module does not operate, and the output terminal of the amplification module output 0; when the second path of enable signal PRE output by the sequential control module is 0, the third PMOS transistor P3, the sixth PMOS transistor P6, the ninth PMOS transistor P9 and the twelfth PMOS transistor P12 are turned on, and the amplification module enters the operating state; when a voltage accessed to the first input terminal of the amplification module is greater than half of the bias voltage accessed to the power terminal of the PUF cell connected to the amplification module, the fourth PMOS transistor P4, the fifth PMOS transistor P5, the tenth PMOS transistor N10 and the eleventh PMOS transistor N11 are turned off, and the output terminal of the amplification module outputs 1; when the voltage accessed to the first input terminal of the amplification module is less than half of the bias voltage accessed to the power terminal of the PUF cell connected to the amplification module, the eighth NMOS transistor N8, the ninth NMOS transistor N9, the seventh PMOS transistor P7 and the eighth PMOS transistor P8 are turned off, and the output terminal of the amplification module outputs 0; when a voltage accessed to the second input terminal of the amplification module is greater than half of the bias voltage accessed to the power terminal of the PUF cell connected to the amplification module, the tenth PMOS transistor P10, the eleventh PMOS transistor P11, the fourteenth NMOS transistor N14 and the fifth NMOS transistor N15 are turned off, an output of the output terminal of the amplification module has no influence; and when the voltage accessed to the second input terminal of the amplification module is less than half of the bias voltage accessed to the power terminal of the PUF cell connected to the amplification module, the twelfth NMOS transistor N12, the thirteenth PMOS transistor P13 and the fourteenth PMOS transistor P14 are turned off, and an output of the output terminal of the amplification module has no influence.

The bit error rate and percentage of instable bits are used for evaluating the reliability of a PUF circuit. The bit error rate indicates the probability of bit flip with respect to a golden key, and the percentage of instable bits indicates the percentage of flipped bits during multiple times of measurement. Under a nominal condition, these two indicators reflect the tolerance to noise of PUF circuit. The reliability of the PUF circuit is tested under 1.2 V/25° C. Wherein, a statistical graph of instable bits when the PUF with two PUF functions provided by the invention operates under a room temperature and a normal voltage according is shown in FIG. 6, and a statistical graph of bit error rates when the PUF with two PUF functions provided by the invention operates under a room temperature and a normal voltage is shown in FIG. 7.

Figure 6:
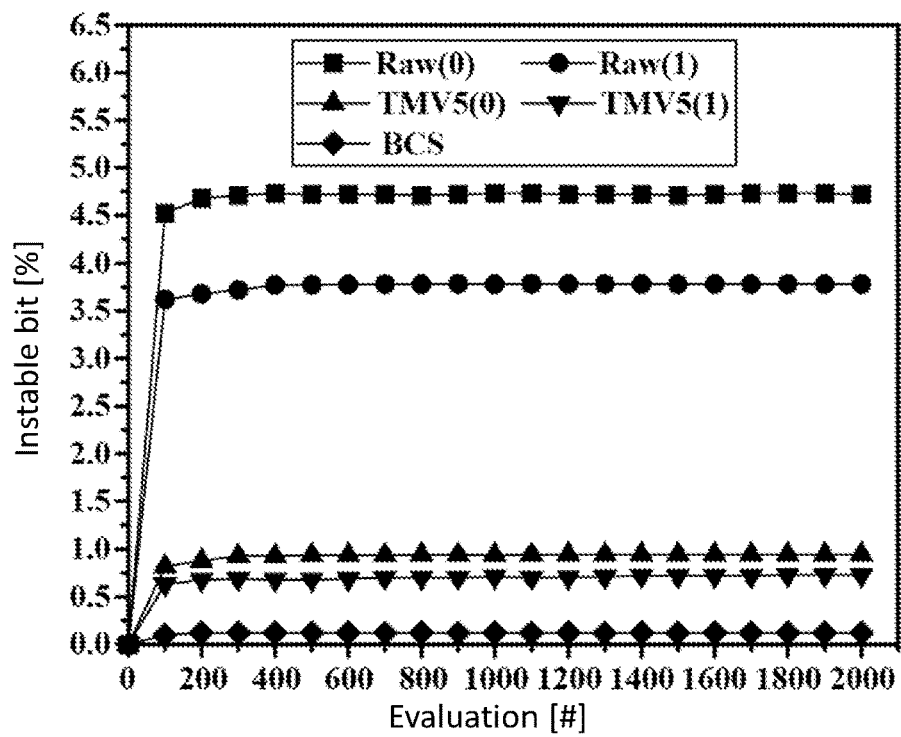
FIG. 6 is a statistical graph of instable bits when the reconfigurable PUF with two PUF functions operates under the room temperature and the normal voltage according to the invention.

In FIG. 6, Raw(0) represents the percentage of native instable bits of responses generated by the reconfigurable PUF with two PUF functions when all the PUF cells are in the SRAM mode; Raw(1) represents the percentage of instable bits of responses generated by the reconfigurable PUF with two PUF functions when all the PUF cells are in the inverter mode; TMV5(0) represents the percentage of instable bits of responses generated by the reconfigurable PUF with two PUF functions, obtained through a temporal majority voting method, when all the PUF cells are in the SRAM mode; TMV5(1) represents the percentage of instable bits of responses generated by the reconfigurable PUF with two PUF functions, obtained through a temporal majority voting method, when all the PUF cells are in the inverter mode; BCS represents the percentage of instable bits of responses generated by the reconfigurable PUF with two PUF functions in a case where the bit configuration strategy (instable PUF cells are in the inverter mode after entering the operating state, and stable PUF cells are in the SRAM mode after entering the operating state) is adopted for configuration. It can be known, by analyzing FIG. 6, that the percentage of instable bits increases with the increase of the number of times of measurement. When all the PUF cells are in the SRAM mode, the worst percentage of instable bits of responses generated by the reconfigurable PUF with two PUF functions under the condition of adopting no stabilization method is 4.72%. When all the PUF cells are in the inverter mode, the worst percentage of instable bits of responses generated by the reconfigurable PUF with two PUF functions under the condition of adopting no stabilization method is 3.78%. When all the PUF cells are in the SRAM mode, the percentage of instable bits of responses generated by the reconfigurable PUF with two PUF functions under the condition of using the TMV method is decreased to 0.94%. When all the PUF cells are in the inverter mode, the percentage of instable bits of responses generated by the reconfigurable PUF with two PUF functions under the condition of adopting the TMV method is decreased to 0.73%. under the condition of adopting the bit configuration strategy (BCS), the percentage of instable bits of responses generated by the reconfigurable PUF with two PUF functions is decreased to 0.12%, indicating that instable bits of PUF responses generated by the reconfigurable PUF with two PUF functions are greatly reduced.

Figure 7:
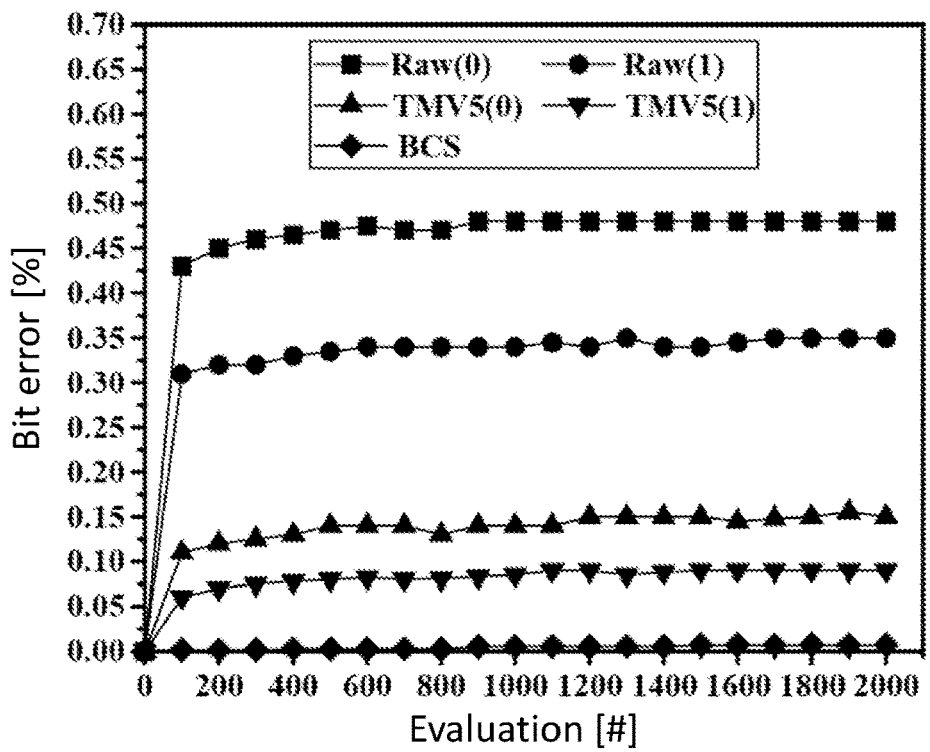
FIG. 7 is a statistical graph of bit error rates when the reconfigurable PUF with two PUF functions operates under a room temperature and a normal voltage according to the invention.

In FIG. 7, Raw(0) represents the native bit error rate of responses generated by the reconfigurable PUF with two PUF functions when all the PUF cells are in the SRAM mode; Raw(1) the native bit error rate of responses generated by the reconfigurable PUF with two PUF functions when all the PUF cells are in the inverter mode; TMV5(0) represents the bit error rate of responses generated by the reconfigurable PUF with two PUF functions, obtained through a temporal majority voting method, when all the PUF cells are in the SRAM mode; TMV5(1) represents the bit error rate of responses generated by the reconfigurable PUF with two PUF functions, obtained through a temporal majority voting method, when all the PUF cells are in the inverter mode; BCS represents the bit error rate of responses generated by the reconfigurable PUF with two PUF functions under the condition of adopting the bit configuration strategy (BCS) for configuration.

It can be known, by analyzing FIG. 7, that when the number of evaluated responses increases to a certain value, the local bit error rate quickly reaches a stable state. When all the PUF cells are all in the SRAM mode, the worst native bit error rate of responses generated by the reconfigurable PUF with two PUF functions under the condition of adopting no stabilization method is 1.89%. When all the PUF cells are in the inverter mode, the worst native bit error rate of responses generated by the reconfigurable PUF with two PUF functions under the condition of adopting no stabilization method is 1.3%. Under the condition of adopting the bit configuration strategy, the bit error rate of responses generated by the reconfigurable PUF with two PUF functions is decreased to 0.08%, indicating that the bit error rate of PUF responses generated by the reconfigurable PUF with two PUF functions is significantly decreased.

The PUF response is determined by mismatching of two inverters in a sub-threshold region. The change of voltage and temperature will affect VT of transistors. When the mismatching relationship is reversed, the PUF response will flip. Under a temperature from −50° C. to 125° C., the stability of responses of the PUF is evaluated. With golden data under 1.2V/25° C. as the reference for bit error rate calculation, bit error rates of the reconfigurable PUF with two PUF functions provided by the invention under different temperatures are shown in FIG. 8.

Figure 8:
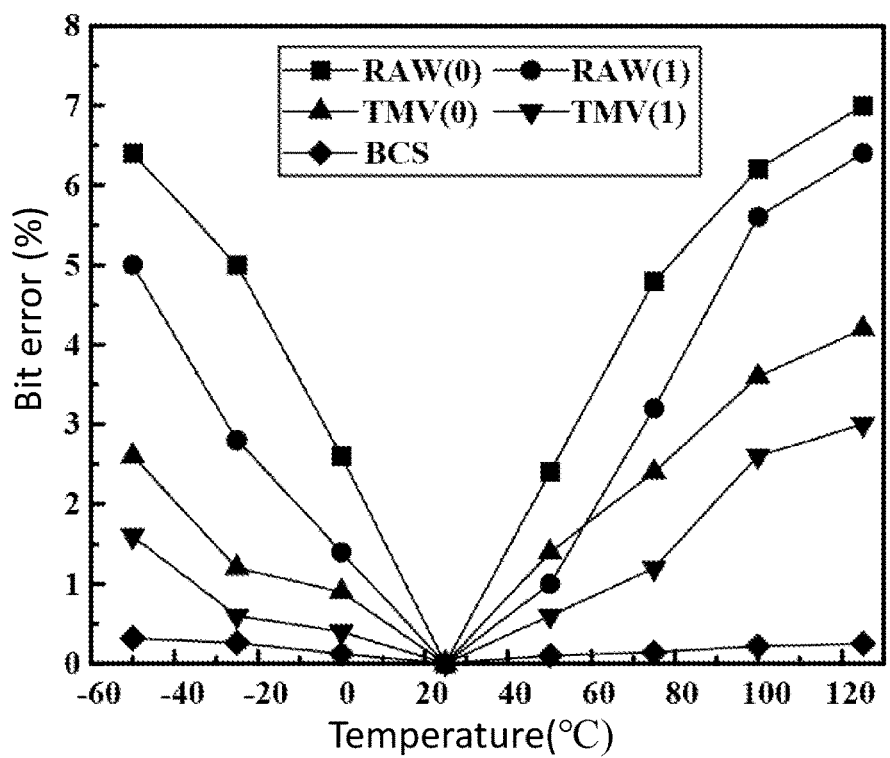
FIG. 8 is a statistical graph of bit error rates when the reconfigurable PUF with two PUF functions operates under different temperatures.

In FIG. 8, Raw(0) represents the native bit error rate of responses generated by the reconfigurable PUF with two PUF functions when all the PUF cells are in the SRAM mode; Raw(1) represents the native bit error rate of responses generated by the reconfigurable PUF with two PUF functions when all the PUF cells are in the inverter mode; TMV5(0) represents the bit error rate of responses generated by the reconfigurable PUF with two PUF functions, obtained through a temporal majority voting method, when all the PUF cells are in the SRAM mode; TMV5(1) represents the bit error rate of responses generated by the reconfigurable PUF with two PUF functions, obtained through a temporal majority voting method, when all the PUF cells are in the inverter mode; BCS represents the bit error rate of responses generated by the reconfigurable PUF with two PUF functions under the condition of adopting the bit configuration strategy (instable PUF cells are in the inverter mode after entering the operating state, and stable PUF cells are in the SRAM mode after entering the operating state) for configuration.

Results in FIG. 8 indicate that the average native bit error rate under −50° C. when all the PUF cells are in the SRAM mode is 6.4%, and the average native bit error rate under −50° C. when all the PUF cells are in the inverter mode is 4.9%. The average bit error rate of responses generated by the reconfigurable PUF with two PUF functions under 125° C. when all the PUF cells are in the SRAM mode is 6.9%, and the average bit error rate of responses generated by the reconfigurable PUF with two PUF functions under 125° C. when all the PUF cells are in the inverter mode is 6.3%. The bit error rate can be decreased through the TMV method. Under the condition of adopting the TMV method, the average bit error rate of responses generated by the reconfigurable PUF with two PUF functions when all the PUF cells are in the SRAM mode is decreased to 4.2%, and the average bit error rate of responses generated by the reconfigurable PUF with two PUF functions when all the PUF cells are in the inverter mode is decreased to 2.9%. Under the condition of adopting the bit configuration strategy (BCS), the bit error rate of responses generated by the reconfigurable PUF with two PUF functions is decreased quickly, and the average bit error rate is decreased to 0.32%, indicating that the sensitivity to temperature of the reconfigurable PUF with two PUF functions provided by the invention is 0.018%/10° C.

Figure 9:
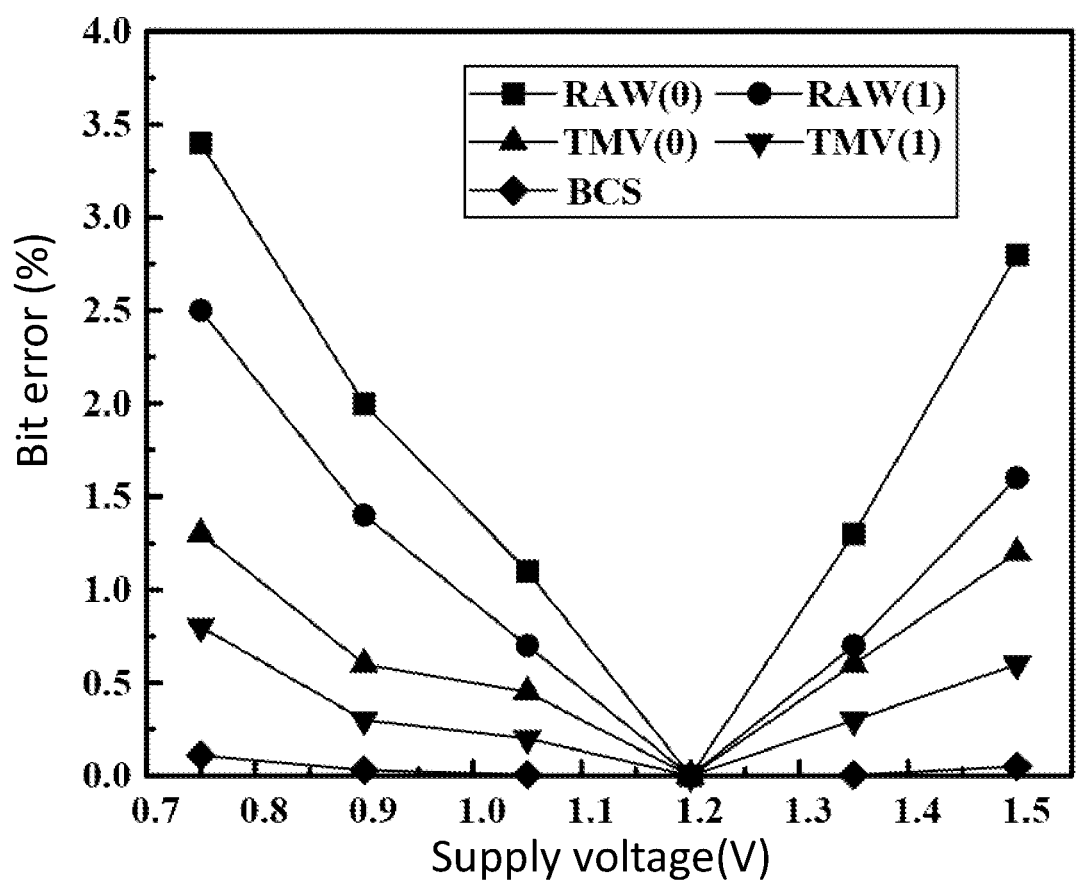
FIG. 9 is a statistical graph of bit error rates when the reconfigurable PUF with two PUF functions operates under different voltages.

Bit error rates of the reconfigurable PUF with two PUF functions provided by the invention under different voltages are shown in FIG. 9.

In FIG. 9, Raw(0) represents the native bit error rate of responses generated by the reconfigurable PUF with two PUF functions when all the PUF cells are in the SRAM mode; Raw(1) represents the native bit error rate of responses generated by the reconfigurable PUF with two PUF functions when all the PUF cells are in the inverter mode; TMV5(0) represents the bit error rate of responses generated by the reconfigurable PUF with two PUF functions, obtained through a temporal majority voting method, when all the PUF cells are in the SRAM mode; TMV5(1) represents the bit error rate of responses generated by the reconfigurable PUF with two PUF functions, obtained through a temporal majority voting method, when all the PUF cells are in the inverter mode; BCS represents the bit error rate of responses generated by the reconfigurable PUF with two PUF functions under the condition of adopting the bit configuration strategy (instable PUF cells are in the inverter mode after entering the operating state, and stable PUF cells are in the SRAM mode after entering the operating state) for configuration.

It can be known, by analyzing FIG. 9, that the average bit error rate of responses generated by the reconfigurable PUF with two PUF functions under 0.75V when all the PUF cells are in the SRAM mode is 3.4%, and the average bit error rate of responses generated by the reconfigurable PUF with two PUF functions under 0.75V when all the PUF cells are in the inverter mode is 2.5%. The average bit error rate of responses generated by the reconfigurable PUF with two PUF functions under 1.5V when all the PUF cells are in the SRAM mode is 2.8%, and the average bit error rate of responses generated by the reconfigurable PUF with two PUF functions under 1.5V when all the PUF cells are in the inverter mode is 1.6%. Under the condition of adopting the bit configuration strategy (BCS), the bit error rate of responses generated by the reconfigurable PUF with two PUF functions is decreased quickly, and the average bit error rate is decreased to 0.11%, indicating that the sensitivity to voltage of the reconfigurable PUF with two PUF functions provided by the invention is 0.014%/0.1V.

The randomness is the degree of randomness of the distribution of responses "1" and "0" of the PUF. 20,480 bits generated by the reconfigurable PUF with two PUF functions are tested with an 800-22 randomness test suite. Under the condition that the number of bits is limited, 10 of 15 sub-tests in 800-22 sub-tests are available. Specific test data is shown in Table 1.

TABLE 1

PUF-based NIST test

| Test items | Length of bit stream | Number of runs | SRAM_mode P_VALUE | Inverter mode P_VALUE | Pass or not |
|---|---|---|---|---|---|
| Frequency | 1024 | 20 | 0.793 | 0.521 | Yes |
| Block Frequency | 1024 | 20 | 0.124 | 0.482 | Yes |
| Runs | 1024 | 20 | 0.638 | 0.437 | Yes |
| Longest Runs | 1024 | 20 | 0.579 | 0.524 | Yes |
| FFT | 1024 | 20 | 0.460 | 0.443 | Yes |
| Cumulative Sums | 1024 | 20 | 0.324 | 0.586 | Yes |
| Non-overlapping | 1024 | 20 | 0.153 | 0.392 | Yes |
| Overlapping Template | 1024 | 20 | 0.722 | 0.427 | Yes |
| Serial | 1024 | 20 | 0.834 | 0.562 | Yes |
| Approximate Entropy | 1024 | 20 | 0.275 | 0.439 | Yes |

It can be known, by analyzing Table 1, that the reconfigurable PUF with two PUF functions provided by the invention successfully passes all the ten randomness tests and shows acceptable randomness.

To sum up, the reconfigurable PUF with two PUF functions provided by the invention has high reliability.

What is claimed is:

1. A reconfigurable physically unclonable function (PUF) with two PUF functions, comprising $2^m \times n$ PUF cells, a sequential control circuit, a row selection circuit, n amplification circuits, n first bit lines, and n second bit lines, wherein m is an integer greater than or equal to 1, n is an integer greater than or equal to 1, wherein the row selection circuit has an enable terminal, m output terminals, $2^m$ first output terminals and $2^m$ second output terminals, m bits of row selection signals are input to the m input terminals of the row selection circuit, the row selection circuit is configured to convert the m bits of row selection signals into $2^m$ bits of row address signals and $2^m$ bits of row initialization signals, configured to output the $2^m$ bits of row address signals via the $2^m$ first output terminals of the row selection circuit, and configured to output the $2^m$ bits of row initialization signals via the $2^m$ second output terminals of the row selection circuit, the $2^m$ bits of row address signals and the $2^m$ bits of row initialization signals are all binary data, only one bit of data in the $2^m$ bits of row address signals is 1, the other bits of data of the $2^m$ bits of row address signals are all 0, only one bit of data of the $2^m$ bits of row initialization signals is 0, the other bits of data of the $2^m$ bits of row initialization signals are all 1, the $k^{th}$ bit of data of the $2^m$ bits of row address signals is output via the $k^{th}$ first output terminal of the row selection circuit, the $k^{th}$ bit of data of the $2^m$ bits of row initialization signals is output via the $k^{th}$ second output terminal of the row selection circuit, the $k^{th}$ bit of data of the $2^m$ bits of row address signals is different from the $k^{th}$ bit of data of the $2^m$ bits of row initialization signals, and k=1, 2, ..., $2^m$;

wherein each of the n amplification circuits has an enable terminal, a first input terminal, a second input terminal and an output terminal;

wherein the sequential control circuit has a first control terminal and a second control terminal, and is configured to generate two paths of enable signals for controlling sequential matching of the row selection circuit and the n amplification circuits, wherein a first path of an enable signal is output via the first control terminal of the sequential control circuit, and a second path of an enable signal is output via the second control terminal of the sequential control circuit;

wherein the $2^m \times n$ PUF cells are distributed in $2^m$ rows and n columns to form a PUF array; each PUF cell has a power terminal, a first input terminal, a second input terminal, a third input terminal, a first output terminal and a second output terminal; the first control terminal of the sequential control circuit is connected to the enable terminal of the row selection module, the second control terminal of the sequential control circuit is connected to the enable terminals of the n amplification circuits, the $k^{th}$ first output terminal of the row selection circuit is connected to the first input terminals of the n PUF cells in the $k^{th}$ row of the PUF array, the $k^{th}$ second output terminal of the row selection circuit is connected to the second input terminals of the n PUF cells in the $k^{th}$ row of the PUF array, the first output terminals of the $2^m$ PUF cells in the $j^{th}$ column of the PUF array are all connected to the $j^{th}$ first bit line, the $j^{th}$ first bit line is connected to the first input terminal of the $j^{th}$ amplification circuit, the second output terminals of the $2^m$ PUF cells in the $j^{th}$ column of the PUF array are all connected to the $j^{th}$ second bit line, the $j^{th}$ second bit line is connected to the second input terminal of the $j^{th}$ amplification circuit, and j=1, 2, ..., n;

wherein when data input to the first input terminals of the n PUF cells in one row of the PUF array is 1 and data input to the second input terminals of the n PUF cells in said row of the PUF array is 0, the n PUF cells enter an operating state, the first output terminal and the second output terminal of each PUF cell in said row respectively generate and output voltage signals, all the PUF cells in the other rows enter a dormant state, and the first output terminals and the second output terminals of the PUF cells in the other rows do not output voltage signals; each PUF cell comprises a first P-channel metal-oxide-semiconductor (PMOS) transistor, a second PMOS transistor, a first N-channel Metal Oxide Semiconductor (NMOS) transistor, a second NMOS transistor, a third NMOS transistor, a fourth NMOS transistor, a fifth NMOS transistor, a sixth NMOS transistor and a seventh NMOS transistor, wherein a source of the first PMOS transistor and a source of the second PMOS transistor are connected and a connecting terminal thereof is the power terminal of the PUF cell, a gate of the first PMOS transistor, a drain of the second PMOS transistor, a drain of the sixth NMOS transistor, a source of the fourth NMOS transistor, a gate of the second NMOS transistor, a drain of the first NMOS transistor and a drain of the third NMOS transistor are connected, a drain of the first PMOS transistor, a gate of the second PMOS transistor, a source of the fifth NMOS transistor, a drain of the second NMOS transistor, a drain of the seventh NMOS transistor, a drain of the fourth NMOS transistor and a gate of the third NMOS transistor are connected, a gate of the first NMOS transistor and a gate of the seventh NMOS transistor are connected and a connecting terminal thereof is the second input terminal of the PUF cell, a source of the first NMOS transistor, a source of the third NMOS transistor, a source of the second NMOS transistor and a source of the seventh NMOS transistor are all grounded, a gate of the fourth NMOS transistor is the third input terminal of the PUF cell, a gate of the fifth NMOS transistor and a gate of the sixth NMOS transistor are connected and a connecting terminal thereof is the first input terminal of the PUF cell, a drain of the fifth NMOS transistor is the first output terminal of the PUF cell, and a source of the sixth NMOS transistor is the second output terminal of the PUF cell;

wherein the reconfigurable PUF with two PUF functions further comprises a bit configuration circuit and a biasing circuit, wherein the bit configuration circuit has n output terminals, the $j^{th}$ output terminal of the bit configuration circuit is connected to the third input terminals of the $2^m$ PUF cells in the $j^{th}$ column of the PUF cell, the bit configuration circuit is configured to generate n bits of binary configuration signals, and the $j^{th}$ bit of the n bits of binary configuration signals is output via the $j^{th}$ output terminal of the bit configuration circuit;

wherein when the $j^{th}$ bit of the n bits of binary configuration signals is 1, the $2^m$ PUF cells in the $j^{th}$ column of the PUF cell are configured to be in an inverter mode;

wherein when the $j^{th}$ bit of the n bits of binary configuration signals is 0, the $2^m$ PUF cells in the $j^{th}$ column of the PUF cells are configured to be in a SRAM mode;

wherein the biasing circuit has n output terminals, the $j^{th}$ output terminal of the biasing circuit is connected to the power terminals of the $2^m$ PUF cells in the $j^{th}$ column of the PUF cell, the biasing circuit is configured to generate n paths of bias voltages, wherein the $n^{th}$ path of bias voltage is output via the $j^{th}$ output terminal of the biasing circuit;

wherein when one PUF cell enters the operating state and is in the SRAM mode, a large voltage deviation is generated due to the cross-coupled inverters competition between the first bit line and the second bit line which are connected to the first output terminal and the second output terminal of said PUF cell, wherein the first bit line theoretically generates a voltage equal to a bias voltage input to the power terminal of said PUF cell and the second bit line theoretically generate a voltage 0;

wherein due to presence of a process variation during circuit fabrication, a voltage generated by the first bit line is close to the bias voltage, a voltage generated by the second bit line is close to 0, and in this case, the output terminal of each of the n amplification circuits connected to the first bit line and the second bit line outputs 1;

wherein when one PUF cell enters the operating state and is in the inverter mode, the first bit line and the second bit line which are connected to the first output terminal and the second output terminal of said PUF cell respectively generate a voltage equal to half of the bias voltage input to the power terminal of the PUF cell;

wherein due to presence of a process variation during circuit fabrication, a voltage generated by the first bit line is close to half of the bias voltage, a voltage generated by the second bit line is close to half of the bias voltage, and the voltage generated by the first bit line is not equal to the voltage generated by the second bit line; in this case, when the voltage generated by the first bit line is greater than half of the bias voltage, the output terminal of each of the n amplification circuits connected to the first bit line and the second bit line outputs 1; when the voltage generated by the first bit line is less than half of the bias voltage, the output terminal of each of the n amplification circuits connected to the first bit line and the second bit line outputs 0;

wherein in the PUF array, instable PUF cells are in the inverter mode after entering the operating state, and stable PUF cells are in the SRAM mode after entering the operating state.

2. The reconfigurable PUF with the two PUF functions according to claim 1, wherein the row selection circuit is realized by a decoder.

3. The reconfigurable PUF with the two PUF functions according to claim 1, wherein each of the n amplification circuits comprises a third PMOS transistor, a fourth PMOS transistor, a fifth PMOS transistor, a sixth PMOS transistor, a seventh PMOS transistor, an eighth PMOS transistor, a ninth PMOS transistor, a tenth PMOS transistor, an eleventh PMOS transistor, a twelfth PMOS transistor, a thirteenth PMOS transistor, a fourteenth PMOS transistor, an eighth NMOS transistor, a ninth NMOS transistor, a tenth NMOS transistor, an eleventh NMOS transistor, a twelfth NMOS transistor, a thirteenth NMOS transistor, a fourteenth NMOS transistor and a fifteenth NMOS transistor;

wherein a positive supply voltage is accessed to a source of the third PMOS transistor, a source of the sixth PMOS transistor, a source of the ninth PMOS transistor and a source of the twelfth PMOS transistor, a gate of the third PMOS transistor, a gate of the sixth PMOS transistor, a gate of the ninth PMOS transistor and a gate of the twelfth PMOS transistor are connected and a connecting terminal thereof is the enable terminal of each of the n amplification circuits, a drain of the third PMOS transistor and a source of the fourth PMOS transistor are connected, a drain of the sixth PMOS transistor and a source of the seventh PMOS transistor are connected, a drain of the fourth PMOS transistor and a source of the fifth PMOS transistor are connected, a drain of the seventh PMOS transistor and a source of the eighth PMOS transistor are connected, a gate of the fourth PMOS transistor, a gate of the fifth PMOS transistor, a gate of the eighth NMOS transistor and a gate of the ninth NMOS transistor are connected and a connecting terminal thereof is the first input terminal of each of the n amplification circuits, a drain of the fifth PMOS transistor, a drain of the eight NMOS transistor, a gate of the seventh PMOS transistor, a gate of the eighth PMOS transistor, a gate of the tenth NMOS transistor and a gate of the eleventh NMOS transistor are connected, a drain of the eighth PMOS transistor and a drain of the tenth NMOS transistor are connected and a connecting terminal thereof is the output terminal of each of the n amplification circuits, a source of the eighth NMOS transistor and a drain of the ninth NMOS transistor are connected, a source of the ninth NMOS transistor is grounded, a source of the tenth NMOS transistor and a drain of the eleventh NMOS transistor are connected, and a source of the eleventh NMOS transistor is grounded; a drain of the ninth PMOS transistor and a source of the tenth PMOS transistor are connected, a drain of the twelfth PMOS transistor and a source of the thirteenth PMOS transistor are connected, a drain of the tenth PMOS transistor and a source of the eleventh PMOS transistor are connected, a drain of the thirteenth PMOS transistor and a source of the fourteenth PMOS transistor are connected, a gate of the tenth PMOS transistor, a gate of the eleventh PMOS transistor, a gate of the twelfth NMOS transistor and a gate of the thirteenth NMOS transistor are connected and a connecting terminal thereof is the second input terminal of each of the n amplification circuits, a drain of the eleventh PMOS transistor, a drain of the twelfth NMOS transistor, a gate of the thirteenth PMOS transistor, a gate of the fourteenth PMOS transistor, a gate of the fourteenth NMOS transistor and a gate of the fifteenth NMOS transistor are connected, a drain of the fourteenth PMOS transistor and a drain of the fourteenth NMOS transistor are connected, a source of the twelfth NMOS transistor and a drain of the thirteenth NMOS transistor are connected, a source of the thirteenth NMOS transistor is grounded, a source of the fourteenth NMOS transistor and a drain of the fifth NMOS transistor are connected, and a source of the fifteenth NMOS transistor is grounded, wherein in each of the n amplification circuits, the third PNMOS transistor, the fourth PMOS transistor, the fifth PMOS transistor, the sixth PMOS transistor, the seventh PMOS transistor, the eighth PMOS transistor, the eighth NMOS transistor, the ninth NMOS transistor, the tenth NMOS transistor and the eleventh NMOS transistor form a first amplifier, and the ninth PMOS transistor, the tenth PMOS transistor, the eleventh PMOS transistor, the twelfth PMOS transistor, the thirteenth PMOS transistor, the fourteenth PMOS transistor, the twelfth NMOS, the thirteenth NMOS transistor, the fourteenth NMOS transistor and the fifth NMOS transistor form a second amplifier;

wherein the second amplifier guarantees a fair competition of the PUF cell, and the first amplifier and the second amplifier identical with the first amplifier guarantee the randomness of the PUF cell;

wherein when the second path of the enable signal which is output by the sequential control circuit is 1, the third PMOS transistor, the sixth PMOS transistor, the ninth PMOS transistor and the twelfth PMOS transistor are turned off, the eighth NMOS transistor, the ninth NMOS transistor, the tenth NMOS transistor, the eleventh NMOS transistor, the twelfth NMOS transistor, the thirteenth NMOS transistor, the fourteenth NMOS transistor and the fifth NMOS transistor leak a current, each of the n amplification circuits does not operate, and the output terminal of each of the n amplification circuits output 0;

wherein when the second path of the enable signal which is output by the sequential control circuit is 0, the third PMOS transistor, the sixth PMOS transistor, the ninth PMOS transistor and the twelfth PMOS transistor are turned on, and each of the n amplification circuits enters the operating state;

wherein when a voltage accessed to the first input terminal of each of the n amplification circuits is greater than half of the bias voltage accessed to the power terminal of the PUF cell connected to each of the n amplification circuits, the fourth PMOS transistor, the fifth PMOS transistor, the tenth PMOS transistor and the eleventh PMOS transistor are turned off, and the output terminal of each of the n amplification circuits outputs 1;

wherein when the voltage accessed to the first input terminal of each of the n amplification circuits is less than half of the bias voltage accessed to the power terminal of the PUF cell connected to each of the n amplification circuits, the eighth NMOS transistor, the ninth NMOS transistor, the seventh PMOS transistor and the eighth PMOS transistor are turned off, and the output terminal of each of the n amplification circuits outputs 0;

wherein when a voltage accessed to the second input terminal of each of the n amplification circuits is greater than half of the bias voltage accessed to the power terminal of the PUF cell connected to each of the n amplification circuits, the tenth PMOS transistor, the eleventh PMOS transistor, the fourteenth NMOS transistor and the fifth NMOS transistor are turned off, an output of the output terminal of each of the n amplification circuits has no influence; and wherein when the voltage accessed to the second input terminal of each of the n amplification circuits is less than half of the bias voltage accessed to the power terminal of the PUF cell connected to each of the n amplification circuits, the twelfth NMOS transistor, the thirteenth PMOS transistor, and the fourteenth PMOS transistor are turned off, and an output of the output terminal of each of the n amplification circuits has no influence.

* * * * *